US009582858B2

United States Patent
Reshetov et al.

(10) Patent No.: US 9,582,858 B2
(45) Date of Patent: Feb. 28, 2017

(54) ENERGY-EFFICIENT ANTI-ALIASING

(75) Inventors: Alexander V. Reshetov, Saratoga, CA (US); Alexey M. Supikov, San Jose, CA (US); Thomas R. Raoux, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 207 days.

(21) Appl. No.: 13/977,056

(22) PCT Filed: May 2, 2012

(86) PCT No.: PCT/US2012/036145
§ 371 (c)(1),
(2), (4) Date: May 12, 2014

(87) PCT Pub. No.: WO2013/165414
PCT Pub. Date: Nov. 7, 2013

(65) Prior Publication Data
US 2014/0232742 A1    Aug. 21, 2014

(51) Int. Cl.
G06T 5/00    (2006.01)
G06T 15/50   (2011.01)

(52) U.S. Cl.
CPC ............ G06T 5/002 (2013.01); G06T 15/503 (2013.01); G06T 2200/12 (2013.01)

(58) Field of Classification Search
None
See application file for complete search history.

(56) References Cited

U.S. PATENT DOCUMENTS 6,700,672 B1   3/2004  Jones et al.
6,999,100 B1   2/2006  Leather et al.

OTHER PUBLICATIONS

International Search Report and Written Opinion received for PCT application No. PCT/US2012/036145, mailed on Jan. 28, 2013, 9 pages.
"Deferred Shading", Deferred shading from Wikipedia, the free encyclopedia, retrieved on Jun. 20, 2013, webpage available at: http://en.wikipedia.org/wiki/Deferred_shading, pp. 1-5.
Jimenez et al., "Filtering Approaches for Real-Time Anti-Aliasing", Intel Labs, webpage available at: http://www.iryoku.com/aacourse, 14 pages.
Jimenez et al., "Filtering Approaches for Real-Time Anti-Aliasing", ACM SIGGRAPH 2011 Course, Intel Labs, Aug. 17, 2011, 5 pages.
Jimenez et al., "Filtering Approaches for Real-Time Anti-Aliasing", webpage available at: http://www.siggraph.org/s2011/content/filtering-approaches-real-time-anti-aliasing-0, Aug. 11, 2011, 5 pages.

(Continued)

*Primary Examiner* — Ke Xiao
*Assistant Examiner* — Jed-Justin Imperial
(74) *Attorney, Agent, or Firm* — Jordan IP Law, LLC

(57) ABSTRACT

Anti-aliasing methods and systems may include logic to conduct a vertical blending weight determination based on horizontal pixel data associated with an image, and conduct a horizontal blending weight determination based on vertical pixel data associated with the image. Additionally, the logic may modify the image based on the vertical blending weight determination and the horizontal blending weight determination, wherein the vertical pixel data is excluded from the vertical blending weight determination, and the horizontal pixel data is excluded from the horizontal blending weight determination.

22 Claims, 5 Drawing Sheets

(56) References Cited

OTHER PUBLICATIONS

Lottes, "FXAA", NVIDIA Corporation, Feb. 2009, 15 pages.
Reshtov, "Morphological Antialiasing", Intel Labs, Association for Computing Machinery, Inc., Aug. 1-3, 2009, pp. 109-116.
"Morphological Anti-Aliasing", From morphological-aa.aspx, retrieved on Jun. 20, 2013, webpage available at: http://sites.amd.com/us/game/technology/Pages/morphological-aa.aspx, pp. 1-2.
Jimenez et al., "Practical Morphological Anti-Aliasing", GPU Pro 2, Universidad de Zaragoza, Lionhead Studios, retrieved on Jun. 20, 2013, webpage available at: http://www.iryoku.com/mlaa/, 10 pages.
Office Action for Taiwanese Patent Application No. 102115271, dated Dec. 27, 2014, 7 pages, including 3 pages of English translation.
Supplementary European Search Report for Patent Application No. 12875839.8, dated Feb. 1, 2016, 10 pages.
Alexander Reshetov et al., "Morphological antialiasing", Proceeding of the 1st ACM conference on high performance graphics, Jan. 1, 2009, 8 pages, Intel Labs, New York, New York, USA.
Dmitry Andreev, "Anti-Aliasing From a Different Perspective", Game Developers Conference 2011, Mar. 4, 2011, 43 pages, and. intercon.ru/releases/talks/dlaagdc2011/slides/, retrieved Jan. 20, 2016, San Francisco, California, USA.
Alexander Reshetov et al., "Efficient post-processing antialiasing on integrated GPUs", Nov. 28, 2012, 1 page, Intel.
Jorge Jimenez et al., "Filtering approaches for real-time antialiasing", ACM Siggraph 2011 Courses on Siggraph 11, .iryoku.com/aacourse, Jan. 1, 2011, 14 pages, New York, New York, USA.
International Preliminary Report on Patentability and Written Opinion received for PCT application No. PCT/US2012/036145, mailed on Nov. 13, 2014, 6 pages.

FIG. 3
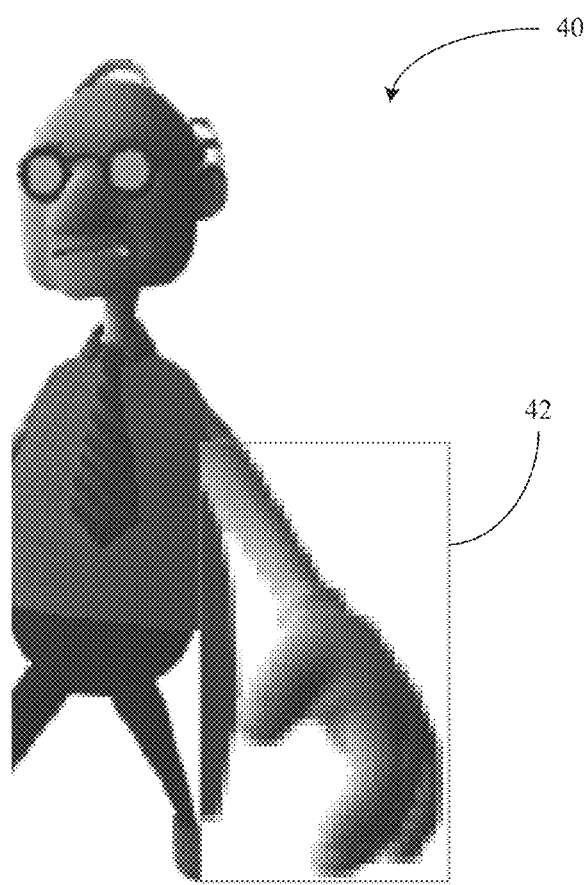
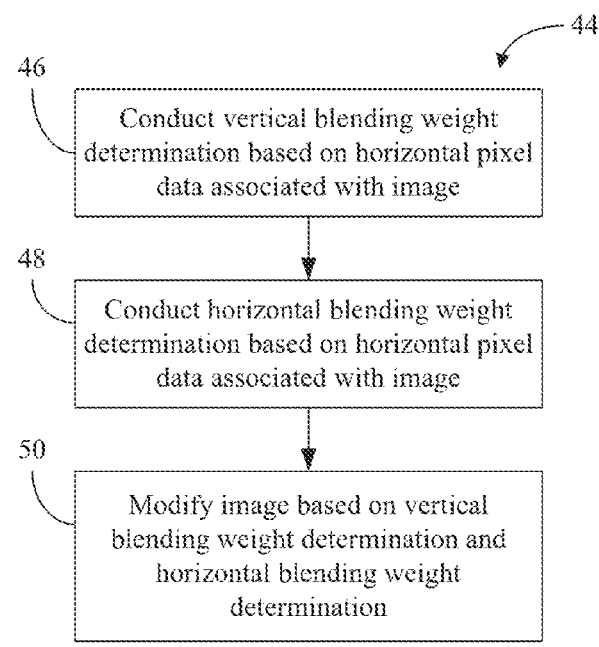
FIG. 4

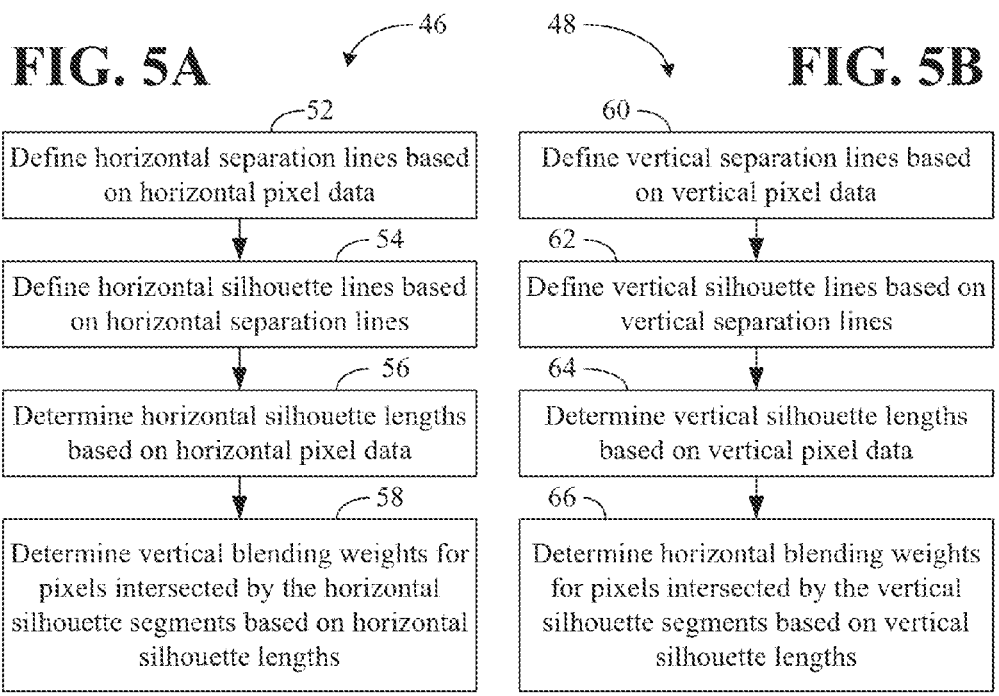
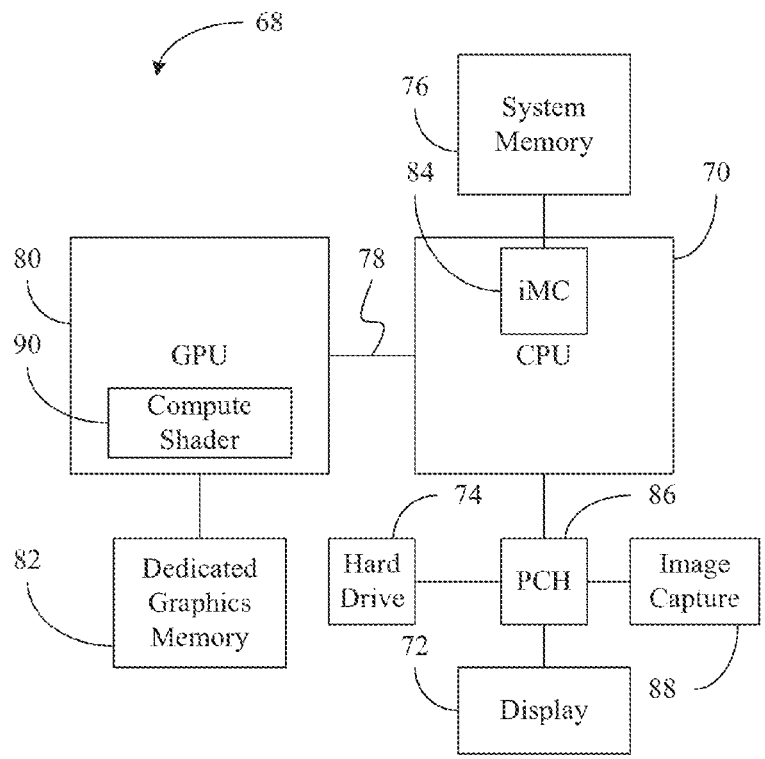
FIG. 6

ENERGY-EFFICIENT ANTI-ALIASING

BACKGROUND

In graphics processing applications, deferred shading may involve decoupling various lighting stages of the graphics processing pipeline in order to achieve richer digital content and streamline content development. Traditional anti-aliasing techniques such as super-sample anti-aliasing (SSAA) and multi-sample anti-aliasing (MSAA), however, may not be well suited for deferred shading due to high bandwidth and computational requirements. While certain alternatives, such as morphological anti-aliasing (MLAA) and other derivative solutions may address some of these concerns, there remains considerable room for improvement, particularly with regard to energy efficiency.

BRIEF DESCRIPTION OF THE DRAWINGS

The various advantages of the embodiments of the present invention will become apparent to one skilled in the art by reading the following specification and appended claims, and by referencing the following drawings, in which:

FIG. 3 is an illustration of an example of an anti-aliased image according to an embodiment;

FIG. 4 is a flowchart of an example of a method of anti-aliasing an image according to an embodiment;

FIG. 5A is a flowchart of an example of a method of conducting a vertical blending weight determination according to an embodiment;

FIG. 5B is a flowchart of an example of a method of conducting a horizontal blending weight determination according to an embodiment;

FIG. 6 is a block diagram of a system according to an embodiment;

DETAILED DESCRIPTION

Figure 1:
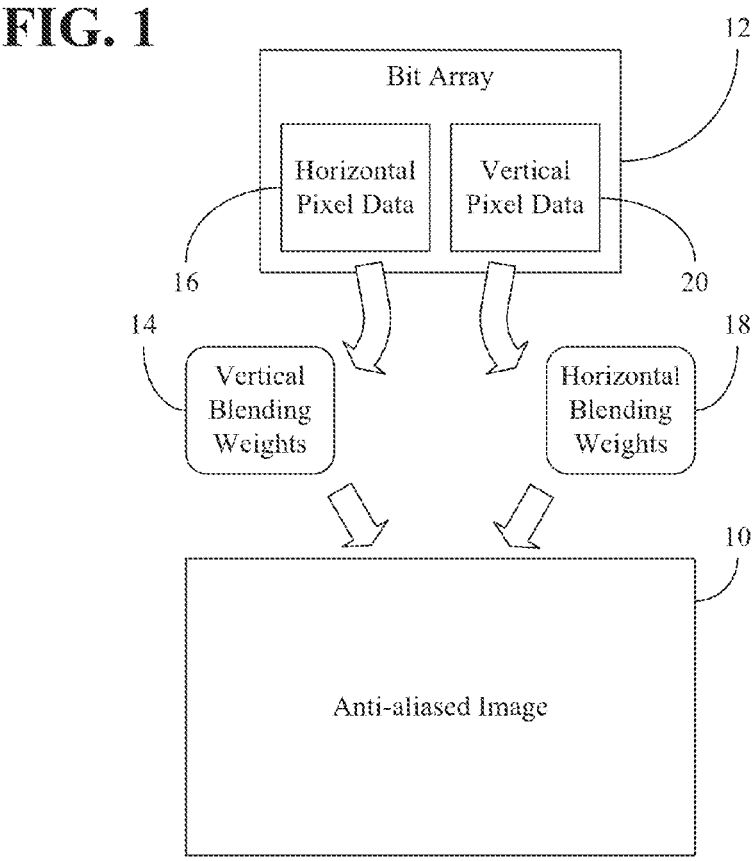
FIG. 1 is a block diagram of an example of an approach to anti-aliasing an image according to an embodiment.

Turning now to FIG. 1, an energy-efficient approach to anti-aliasing an image 10 is shown. In the illustrated example, a bit array 12 generally includes pixel data such as color discontinuity data, depth discontinuity data, and so forth, wherein the discontinuities can be expressed as bit integers in either the horizontal or vertical direction. As an example, for an n×m pixel image, (n−1)m/32 32-bit integers could be used to express discontinuity data in the horizontal direction, and (n−1)m/32 32-bit integers could be used to express discontinuity data in the vertical direction. As will be discussed in greater detail, the discontinuity data can be used to identify noticeably different pixels in the image 10, wherein the pixel discontinuities may be indicative of silhouette edges passing through these pixels, in the image 10. Anti-aliasing can reconstruct these silhouettes by modifying the filtering coefficients applied to the image 10. Filtering coefficients may be modified by adjusting blending weights associated with the underlying filters.

In the illustrated example, vertical blending weights 14 may be determined based on horizontal pixel data 16 in the bit array 12, and horizontal blending weights 18 may be determined based on vertical pixel data 20 in the bit array 12. More particularly, the vertical pixel data 20 may be excluded from the determination of the vertical blending weights 14, and the horizontal pixel data 16 may be excluded from the determination of the horizontal blending weights 18. Such an approach can enable each row and column of the image 10 to be processed independently, eliminate superfluous edge searching and therefore reduce processing overhead and power consumption.

Figure 2A:
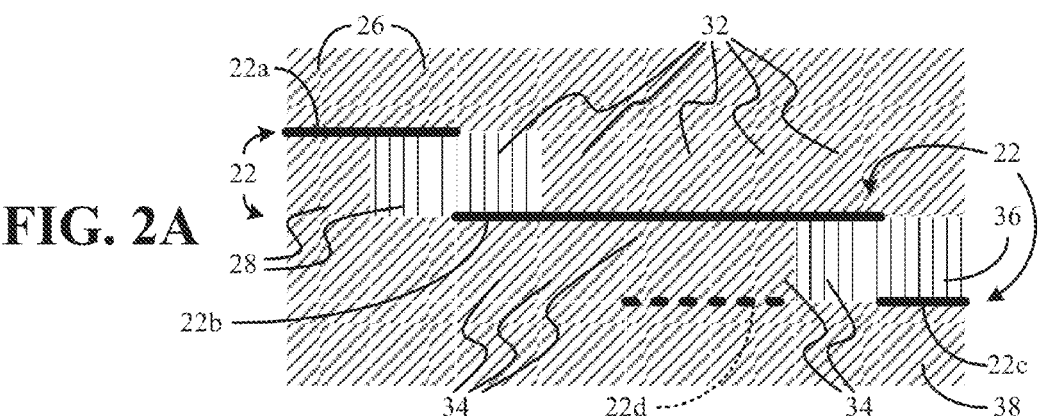
FIGS. 2A and 2B are block diagrams of an example of a blending weight determination for an image according to an embodiment.

FIG. 2A shows a portion of the image 10 (FIG. 1), wherein each shaded square represents a pixel. Thus, a 4×8 pixel region is shown, in the illustrated example, various separation lines 22 (22a-22d) represent a horizontal edge within the image for adjacent pixels that are different from one another. For example, the separation line 22a represent pixel discontinuities between pixels 26 and pixels 28. The discontinuities may be color related, depth related, etc. Similarly, a separation line 22b may represent discontinuities between pixels 32 and pixels 34, and a separation line 22c may represent discontinuities between pixel 36 and pixel 38. While the illustrated separation lines 22 are horizontal lines, vertical separation lines may also be reflected in the image 10 (FIG. 1).

Figure 2B:
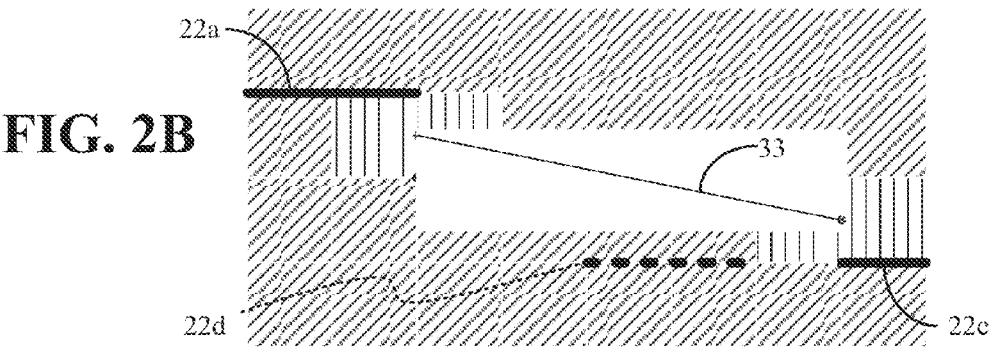

FIG. 2B demonstrates that the separation lines 22 may be used to define one or more horizontal silhouette lines, wherein vertical blending weights may be determined for one or more pixels intersected by the horizontal silhouette lines. In particular, a silhouette line 33 is defined by the separation lines 22a, 22b, and 22c (FIG. 2A), in the example shown. Moreover, the silhouette line 33 may be defined in response to determining that the separation lines 22a-22c are staggered. Thus, the illustrated silhouette line 33 may be effectively approximated/inferred based on the staggered configuration of the separation lines 22a-22c. Of particular note is that such an approach can be helpful in eliminating superfluous edge searches using vertical data.

As will be discussed in greater detail, blending weights such as the vertical blending weights 14 (FIG. 1) may be assigned to the regions of the image corresponding to one or more of the silhouette lines in order to anti-alias the image, smooth out the edges and remove visible distortion. For example, blending weights might be assigned to the pixels intersected by the silhouette line 33, wherein the blending weights can be a function of the length of the silhouette line 33.

In one example, the blending weight assignment may be bypassed (e.g., skipped) under certain circumstances. More particularly, it may be determined that since the pixels above the separation line 22d touch two separation lines simultaneously, the arrangement may be indicative of two objects barely touching each other or overlapping. Accordingly blending between the two objects might not be desirable from a visual standpoint.

Turning now to FIG. 3, an image 40 is shown in which a portion 42 of the image 40 is enlarged and undergoes anti-aliasing as described herein. The blending weights applied to pixels in the enlarged portion 42 substantially smooth out the edges that would be otherwise be perceptible as a result of the discontinuous pixels.

FIGS. 4, 5A and 5B show a method 44 of anti-aliasing an image. The method 44 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method 44 may be written in any combination of one or more programming languages, including an object oriented programming language such as C++ or the like and conventional procedural programming languages, such as the "C" programming language or similar programming languages.

Illustrated processing block 46 provides for conducting a vertical blending weight determination based on horizontal pixel data associated with the image, wherein the vertical blending weight determination excludes vertical pixel data associated with the image. FIG. 5A demonstrates that the vertical blending weight determination may involve defining one or more horizontal separation lines at block 52 based on the horizontal pixel data based on the horizontal pixel data, defining one or more horizontal silhouette lines at block 54 based on the horizontal separation lines, determining horizontal silhouette lengths at block 56, and determining vertical blending weights for one or more pixels intersected by horizontal silhouette lines at block 58. In the illustrated example, the horizontal silhouette lengths are used to determine the vertical blending weights, as already discussed.

A horizontal blending weight determination may be conducted at block 48 based on vertical pixel data, wherein the horizontal blending weight determination excludes the horizontal pixel data. FIG. 5B demonstrates that the horizontal blending weight determination may involve defining one or more vertical separation lines at block 60 based on the vertical pixel data, defining one or more vertical silhouette lines at block 62 based on the vertical separation lines, determining vertical silhouette lengths at block 64 based on the vertical pixel data, and determining horizontal blending weights for one or more pixels intersected by the vertical silhouette lines at block 66. In the illustrated example, the vertical silhouette lengths are used to determine the horizontal blending weights.

As already noted, the pixel data, which may include color discontinuity data, depth discontinuity data, and so forth, can be stored as a bit array such as the bit array 12 (FIG. 1). Accordingly, the lengths of the silhouette lines may be determined using very efficient bit scanning instructions. For example, three instructions might be used to detect a silhouette line with a length of twenty-five: bit scan left, logical xor, followed by another bit scan instruction. By contrast, conventional approaches that store pixel discontinuity data as a two-dimensional (2D) float array might require twelve texture sampler requests to make such a determination (e.g., sampling every other pixel). Illustrated block 50 modifies the image based on the vertical and horizontal blending weight determinations.

Turning now to FIG. 6, a computing system 68 is shown in which anti-aliasing is implemented. The computing system 68 may be part of a mobile platform such as a laptop, PDA (personal digital assistant), wireless smart phone, media player, imaging device, MID (mobile Internet device), any smart device such as a smart phone, smart tablet and so forth, or any combination thereof. The illustrated computing system 68 includes a CPU 70, a display device 72, a hard disk drive 74 and system memory 76, which could include, for example, double data rate (DDR) synchronous dynamic random access memory (SDRAM, e.g., DDR3 SDRAM JEDEC Standard JESD79-3C, April 2008) modules. The modules of the system memory 76 may be incorporated into a single inline memory module (SIMM), dual inline memory module (DIMM), small outline DIMM (SODIMM), and so forth.

The computing system 68 may include a graphics bus (e.g., slot) 78, wherein a graphics card (not shown) containing a graphics processing unit (GPU) 80 and dedicated graphics memory 82 could be coupled (e.g., plugged into) the graphics bus 78. For example, the graphics bus 78 could include a PCI Express Graphics (PEG, e.g., Peripheral Components Interconnect/PCI Express x16 Graphics 150W-ATX Specification 1.0, PCI Special Interest Group) bus, an Accelerated Graphics Port (e.g., AGP V3.0 Interface Specification, September 2002) bus, and so forth. The CPU 70 may have an integrated memory controller (iMC) 84, and one or more processor cores (not shown) to execute one or more drivers associated with a host OS (operating system) and/or application software, wherein each core may be fully functional with instruction fetch units, instruction decoders, level one (L1) cache, execution units, and so forth. The CPU 70 could alternatively communicate with an off-chip variation of the IMC 84, also known as a Northbridge, via a front side bus. The illustrated CPU 70 communicates with a platform controller hub (PCH) 86, also known as a Southbridge, via a hub bus. The iMC 84/CPU 70 and the PCH 86 are sometimes referred to as a chipset.

The illustrated computing system 68 also includes an image capture module 88, which may be used to obtain image/video content for visual output via the display device 72. The image capture module 88 could include, for example, a camera, camcorder, etc. The video content may also be obtained from the hard drive 74, the system memory 76, software (e.g., media player, game player) running on the CPU 70 and/or GPU 80, or from an off-platform device (e.g., web server, remote image capture device, etc.) via a network controller (not shown). The illustrated GPU 80 is configured to execute post-processing compute shader logic 90 that conducts a vertical blending weight determination based on horizontal pixel data associated with an image, conducts a horizontal blending weight determination based on vertical pixel data associated with the image, and modifies the image based on the vertical and horizontal blending weight determinations, wherein the vertical pixel data is excluded from the vertical blending weight determination and the horizontal pixel data is excluded from the horizontal blending weight determination, as already discussed.

Techniques described herein therefore enable efficient hardware utilization through the deployment of bit arrays, wherein only minimally required data is stored and processed. Additionally, issues concerning data locality can be addressed through the use of only horizontal separation lines to find blending weights in the vertical direction, and vice versa. For example, each image row and column can be processed completely independently, wherein blending coefficients may be updated only for the currently processed rows/columns. The coefficients may depend solely on data in adjacent rows/columns, which leads to much more energy-efficient operation. Practically, the techniques described herein may enable execution of the anti-aliasing solution in a tile-based architecture with each tile using data exclusively from a single-pixel neighborhood of the tile. These and other data locality concerns may further be addressed by bypassing blending weight assignments for pixels that are intersected by two adjacent separation lines.

Embodiments may therefore involve a method of anti-aliasing an image in which a vertical blending weight determination is conducted based on horizontal pixel data associated with the image. The method can also provide for conducting a horizontal blending weight determination based on vertical pixel data associated with the image. In addition, the image may be modified based on the vertical and horizontal blending weight determinations, wherein the vertical pixel data is excluded from the vertical blending weight determination and the horizontal pixel data is excluded from the horizontal blending weight determination.

Embodiments may also include a system having a graphics processor with logic to conduct a vertical blending weight determination based on horizontal pixel data associated with an image, and conduct a horizontal blending weight determination based on vertical pixel data associated with the image. The logic can also modify the image based on the vertical and horizontal blending weight determinations, wherein the vertical pixel data is to be excluded from the vertical blending weight determination, and the horizontal pixel data is to be excluded from the horizontal blending weight determination. The system may also include a display device to output the image.

Additionally, embodiments can include at least one computer readable storage medium having a set of instructions which, if executed by a processor, cause a computer to conduct a vertical blending weight determination based on horizontal pixel data associated with an image. The instructions may also cause a computer to conduct a horizontal blending weight determination based on vertical pixel data associated with the image, and modify the image based on the vertical blending weight determination and the horizontal blending weight determination. In one example, the vertical pixel data is to be excluded from the vertical blending weight determination and the horizontal pixel data is to be excluded from the horizontal blending weight determination.

Embodiments may also involve a method of anti-aliasing an image in which a hit array is used to store horizontal and vertical pixel data associated with the image. The method can also provide for conducting a vertical blending weight determination based on horizontal pixel data, wherein conducting the vertical blending weight determination includes identifying one or more horizontal separation lines based on the horizontal pixel data. The vertical blending weight determination may also include defining one or more horizontal silhouette lines based on the horizontal separation lines, determining one or more horizontal silhouette lengths based on the horizontal pixel data, and determining vertical blending weights for one or more pixels intersected by the one or more horizontal silhouette lines based on the one or more horizontal silhouette lengths. The method may also provide for conducting a horizontal blending weight determination based on vertical pixel data associated with the image, wherein conducting the horizontal blending weight determination includes identifying one or more vertical separation lines based on the vertical pixel data. The horizontal blending weight determination can also include defining one or more vertical silhouette lines based on the one or more vertical separation lines, determining one or more vertical silhouette lengths based on the vertical pixel data, and determining horizontal blending weights for one or more pixels intersected by the one or more vertical silhouette lines based on the one or more vertical silhouette lengths. In addition, the method may provide for modifying the image based on the vertical and horizontal blending weight determinations, wherein the vertical pixel data is excluded from the vertical blending weight determination and the horizontal pixel data is excluded from the horizontal blending weight determination.

Figure 7:
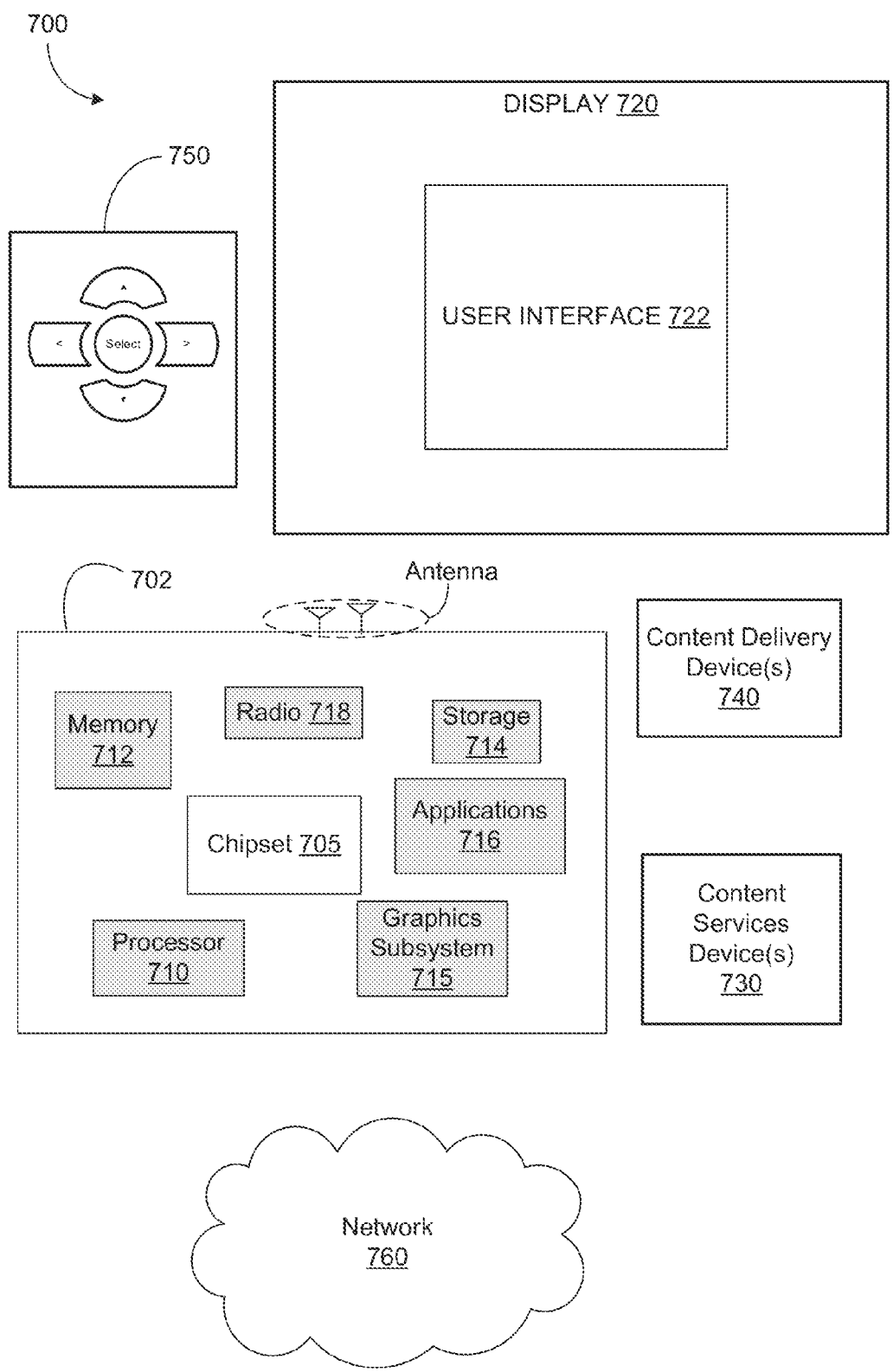
FIG. 7 is a block diagram of an example of a system having a navigation controller according to an embodiment.

FIG. 7 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internee device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM), Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
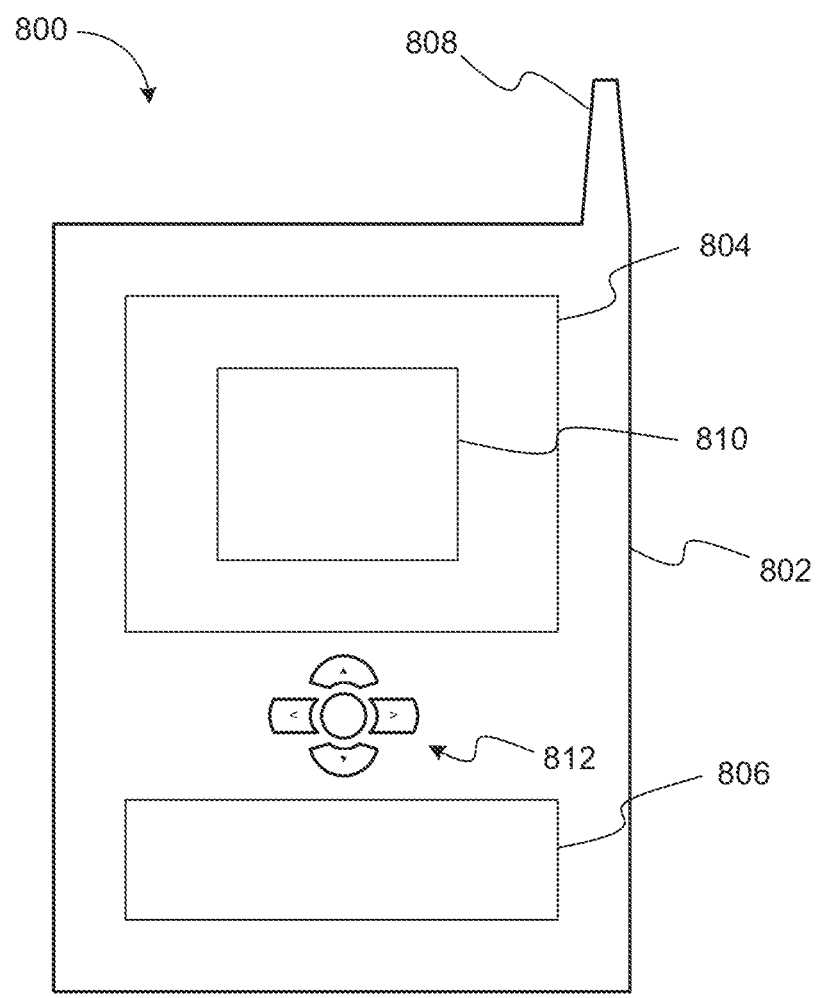
FIG. 8 is a block diagram of an example of a system having a small form factor according to an embodiment.

As described above, system 700 may be embodied in varying physical styles or form factors. FIG. 8 illustrates embodiments of a small form factor device 800 in which system 700 may be embodied, In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile interact device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well The embodiments are not limited in this context.

As shown in FIG, 8, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PH)), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Techniques described herein may therefore provide a feed-forward system that ensures both real-time operation of the consumer video pipeline and dynamic updating of the operating pipeline to deliver optimal visual perceptual quality and viewing experience. In particular, a discrete control system for the video pipeline can dynamically adapt operating points in order to optimize a global configuration of interactive component modules that are related to video perceptual quality. In a series configuration, the perceptual quality analysis module may be placed before the video processing pipeline and parameters determined for the post-processing pipeline may be used for the same frame. In the case of distributed computation of the quality analysis block or when perceptual quality analysis needs to be performed at intermediate points in the pipeline, the parameters determined using a given frame may be applied on the next frame to ensure real-time operation. Distributed computation is sometimes beneficial in reducing complexity as certain elements for perceptual quality computation may already be computed in the post-processing pipeline and can be re-used. Illustrated approaches may also be compatible with closed-loop control where the perceptual quality analysis is re-used at the output of the video processing pipeline to estimate output quality, which is also used by the control mechanism.

Embodiments of the present invention are applicable for use with all types of semiconductor integrated circuit ("IC") chips Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
using a bit array to identify horizontal pixel data associated with an image;
using the bit array to identify vertical pixel data associated with an image;
conducting a vertical blending weight determination based on the horizontal pixel data, wherein conducting the vertical blending weight determination includes,
defining one or more horizontal separation lines based on the horizontal pixel data,
defining one or more horizontal silhouette segments based on the one or more horizontal separation lines,
determining or more horizontal silhouette lengths based on the horizontal pixel data, and
determining vertical blending weights for one or more pixels intersected by the one or more horizontal silhouette segments based on the one or more horizontal silhouette lengths;
conducting a horizontal blending weight determination based on vertical pixel data associated with the image, wherein conducting the horizontal blending weight determination includes,
defining one or more vertical separation lines based on the vertical pixel data,
defining one or more vertical silhouette segments based on the one or more vertical separation lines,
determining one or more vertical silhouette lengths based on the vertical pixel data, and
determining horizontal blending weights for one or more pixels intersected by the one or more vertical silhouette segments based on the one or more vertical silhouette lengths;
modifying the image based on the vertical blending weight determination and the horizontal blending weight determination, wherein the vertical pixel data is excluded from the vertical blending weight determination and the horizontal pixel data is excluded from the horizontal blending weight determination;
detecting a pixel that is adjacent to two separation lines;
bypassing a blending weight assignment for the pixel that is adjacent to two separation lines to limit edge searching, and reduce processing overhead and power consumption; and
outputting the image to a display device.

2. The method of claim 1, further including defining two or more staggered horizontal separation lines based on the horizontal pixel data, wherein at least one of the one or more horizontal silhouette segments is approximated based on the two or more staggered horizontal separation lines.

3. The method of claim 1, further including defining two or more staggered vertical separation lines based on the vertical pixel data, wherein at least one of the one or more vertical silhouette segments is approximated based on the two or more staggered vertical separation lines.

4. The method of claim 1, wherein the horizontal pixel data and the vertical pixel data includes discontinuity data.

5. A method comprising:
conducting a vertical blending weight determination based on horizontal pixel data associated with an image;
conducting a horizontal blending weight determination based on vertical pixel data associated with the image;
modifying the image based on the vertical blending weight determination and the horizontal blending weight determination, wherein the vertical pixel data is excluded from the vertical blending weight determination and the horizontal pixel data is excluded from the horizontal blending weight determination;
detecting a pixel that is adjacent to two separation lines;
bypassing a blending weight assignment for the pixel that is adjacent to two separation lines to limit edge searching, and reduce processing overhead and power consumption; and
outputting the image to a display device;
wherein conducting the vertical blending weight determination includes:
defining one or more horizontal separation lines based on the horizontal pixel data;
defining one or more horizontal silhouette segments based on the one or more horizontal separation lines; and
determining vertical blending weights for one or more pixels intersected by the one or more horizontal silhouette segments; and
wherein conducting the horizontal blending weight determination includes:
defining one or more vertical separation lines based on the vertical pixel data;
defining one or more vertical silhouette segments based on the one or more vertical separation lines; and
determining horizontal blending weights for one or more pixels intersected by the one or more vertical silhouette segments.

6. The method of claim 5, further including defining two or more staggered horizontal separation lines based on the horizontal pixel data, wherein at least one of the one or more horizontal silhouette segments is approximated based on the two or more staggered horizontal separation lines.

7. The method of claim 5, further including defining two or more staggered vertical separation lines based on the vertical pixel data, wherein at least one of the one or more vertical silhouette segments is approximated based on the two or more staggered vertical separation lines.

8. The method of claim 5, further including:
using a bit array to identify the horizontal pixel data; and
determining one or more horizontal silhouette lengths based on the horizontal pixel data, wherein the vertical blending weights are determined based on the one or more horizontal silhouette lengths.

9. The method of claim 5, further including:
using a bit array to identify the vertical pixel data; and
determining one or more vertical silhouette lengths based on the vertical pixel data, wherein the horizontal blending weights are determined based on the based on the one or more vertical silhouette lengths.

10. The method of claim 5, wherein the horizontal pixel data and the vertical pixel data includes discontinuity data.

11. A system comprising:
a graphics processor including logic to,
conduct a vertical blending weight determination based on horizontal pixel data associated with an image,
conduct a horizontal blending weight determination based on vertical pixel data associated with the image, and
modify the image based on the vertical blending weight determination and the horizontal blending weight determination, wherein the vertical pixel data is to be excluded from the vertical blending weight determination and the horizontal pixel data is to be excluded from the horizontal blending weight determinations;
define one or more horizontal separation lines based on the horizontal pixel data, define one or more horizontal silhouette segments based on the one or more horizontal separation lines;
determine vertical blending weights for one or more pixels intersected by the one or more horizontal silhouette segments;
define one or more vertical separation lines based on the vertical pixel data, define one or more vertical silhouette segments based on the one or more vertical separation lines;
determine horizontal blending weights for one or more pixels intersected by the one or more vertical silhouette segments;
detect that a pixel is adjacent to two separation lines; and
bypass a blending weight assignment for the pixel that is adjacent to two separation lines to limit edge searching, and reduce processing overhead and power consumption; and
a display device to output the image.

12. The system of claim 11, wherein the logic is to define two or more staggered horizontal separation lines based on the horizontal pixel data, wherein at least one of the one or more horizontal silhouette segments is to be approximated based on the two or more staggered horizontal separation lines.

13. The system of claim 11, wherein the logic is to define two or more staggered vertical separation lines based on the vertical pixel data, wherein at least one of the one or more vertical silhouette segments is to be approximated based on the two or more staggered vertical separation lines.

14. The system of claim 11, wherein the logic is to,
use a bit array to identify the horizontal pixel data, and
determine one or more horizontal silhouette lengths based on the horizontal pixel data, wherein the vertical blending weights are to be determined based on the one or more horizontal silhouette lengths.

15. The system of claim 11, wherein the logic is to,
use a bit array to identify the vertical pixel data, and
determine one or more vertical silhouette lengths based on the vertical pixel data, wherein the horizontal blending weights are to be determined based on the one or more vertical silhouette lengths.

16. The system of claim 11, wherein the horizontal pixel data and the vertical pixel data is to include discontinuity data.

17. At least one non-transitory computer readable storage medium comprising a set of instructions which, if executed by a processor, cause a computer to:
conduct a vertical blending weight determination based on horizontal pixel data associated with an image;

conduct a horizontal blending weight determination based on vertical pixel data associated with the image
modify the image based on the vertical blending weight determination and the horizontal blending weight determination, wherein the vertical pixel data is to be excluded from the vertical blending weight determination and the horizontal pixel data is to be excluded from the horizontal blending weight determination;
define one or more horizontal separation lines based on the horizontal pixel data define one or more horizontal silhouette segments based on the one or more horizontal separation lines;
determine vertical blending weights for one or more pixels intersected by the one or more horizontal silhouette segments;
define one or more vertical separation lines based on the vertical pixel data;
define one or more vertical silhouette segments based on the one or more vertical separation lines;
determine horizontal blending weights for one or more pixels intersected by the one or more vertical silhouette segments;
detect that a pixel is adjacent to two separation lines; and
bypass a blending weight assignment for the pixel that is adjacent to two separation lines to limit edge searching, and reduce processing overhead and power consumption; and
output the image to a display device.

18. The medium of claim 17, wherein the instructions, if executed, cause a computer to define two or more staggered horizontal separation lines based on the horizontal pixel data, wherein at least one of the one or more horizontal silhouette segments is to be approximated based on the two or more staggered horizontal separation lines.

19. The medium of claim 17, wherein the instructions, if executed, cause a computer to define two or more staggered vertical separation lines based on the vertical pixel data, wherein at least one of the one or more vertical silhouette segments is to be approximated based on the two or more staggered vertical separation lines.

20. The medium of claim 17, wherein the instructions, if executed, cause a computer to:
use a bit array to identify the horizontal pixel data; and
determine one or more horizontal silhouette lengths based on the horizontal pixel data, wherein the vertical blending weights are to be determined based on the one or more horizontal silhouette lengths.

21. The medium of claim 17, wherein the instructions, if executed, cause a computer to:
use a bit array to identify the vertical pixel data; and
determine one or more vertical silhouette lengths based on the vertical pixel data, wherein the horizontal blending weights are to be determined based on the one or more vertical silhouette lengths.

22. The medium of claim 17, wherein the horizontal pixel data and the vertical pixel data is to include discontinuity data.

* * * * *